Jan. 16, 1951 P. RUSNOV 2,538,630
LAY BAR AND SHUTTLE GUIDE
Filed July 13, 1948
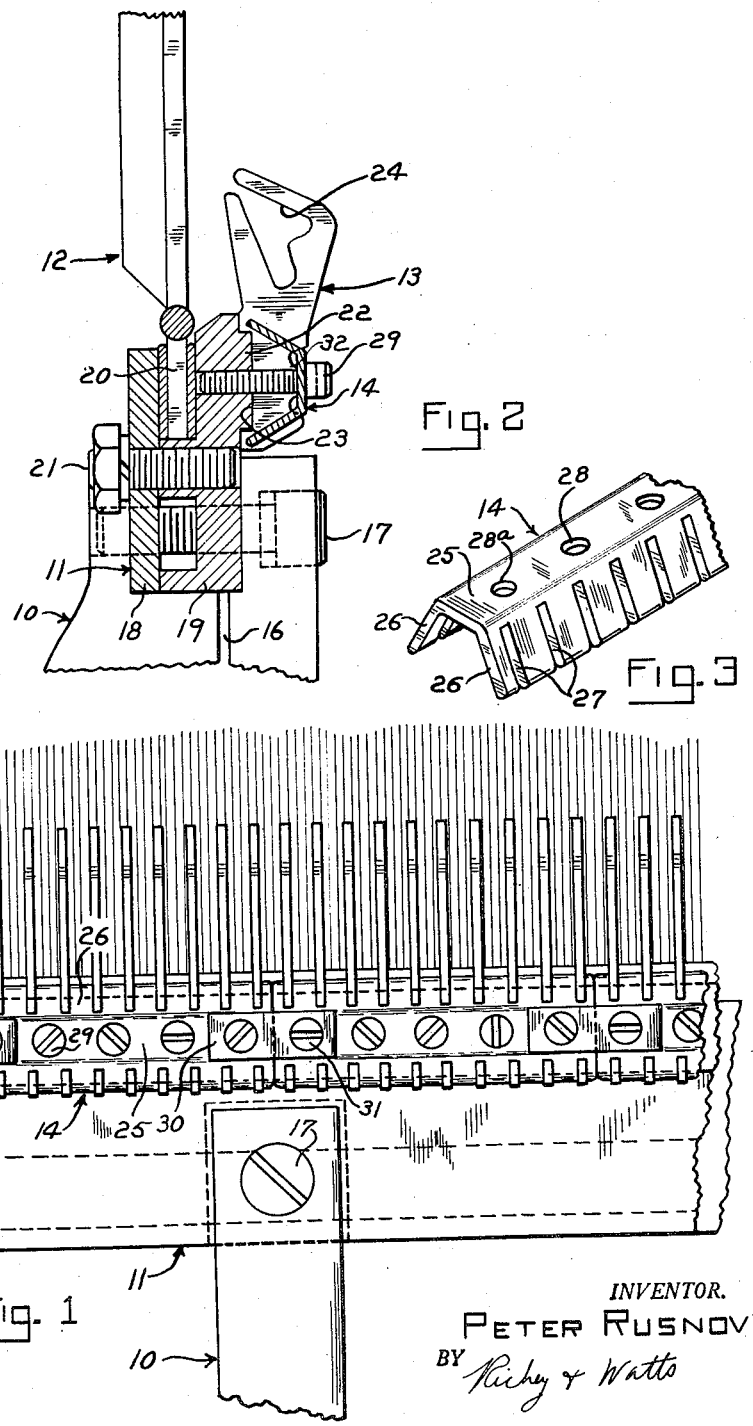
INVENTOR.
PETER RUSNOV
BY Richey & Watts
ATTORNEYS Patented Jan. 16, 1951

2,538,630

UNITED STATES PATENT OFFICE 2,538,630

LAY BAR AND SHUTTLE GUIDE

Peter Rusnov, Cleveland, Ohio, assignor to The Warner & Swasey Company, Cleveland, Ohio, a corporation of Ohio Application July 13, 1948, Serial No. 38,504

7 Claims. (Cl. 139—188)

This invention relates to looms for weaving, and more particularly to a lay mechanism incorporating improved detachable shuttle guides.

A lay mechanism of the general type to which this invention relates is described in the patent to Moessinger, 2,316,703, it being understood that the present invention does not reside in the entire lay mechanism and its operation, but rather in the arrangement of the shuttle guides for use on a lay mechanism. It has been found that for high-speed operation employing small shuttles or thin flexible weft needles there can be very little interruption in the guiding of the shuttle. Accordingly, it is necessary to employ a relatively large number of shuttle guides, the spacing between the guides being comparatively small. It is important that the alignment of the guiding recesses in the guides be precise, and yet it is also desirable to make the guides detachable for replacement due to wear or damage thereto.

It is a feature of the present invention that the detachable shuttle guides are maintained in precise vertical alignment by interlocking tongue and groove means formed on the lay mechanism and the guides, and simultaneously the guides are precisely positioned laterally by novel clamp means having slots therein formed to receive the individual guides. With this arrangement the lay mechanism may be machined to provide for the vertical alignment of the guides and the guides may be formed in a manner whereby they are all identical, so that they are necessarily positively and precisely positioned on the lay assembly. With the construction made in accordance with the invention, it is impossible to assemble the guides with any misalignment thereof, and yet the guides are readily assembled and removed from the lay without need for any skill or judgment on the part of the loomfixer. By holding the vertical alignment means formed in the guides to size, any size or shape guides may be readily fitted to the lay with assurance that the shuttle or weft guiding recesses will all be in precise alignment.

The manner in which these objects and advantages may be attained will be apparent from the following detailed description of a preferred form of the invention.

In the drawings:

Fig. 1 is a fragmentary front elevation of the lay assembly incorporating the novel guide arrangement;

Fig. 2 is a vertical section through the assembly; and

Fig. 3 is a fragmentary perspective view of one of the guide clamps.

Referring to the drawings, the usual elements common to many looms are provided. Any suitable form of reed assembly 12 is mounted by means of a two-part lay assembly 19, which in turn is supported on the lay lever or sword 10 for the usual rocking or oscillating motion. Also mounted on the lay assembly 19 are a plurality of novel shuttle or weft needle guides 13, shown in their preferred form as guide plates, retained and spaced by the longitudinal clamp means 14 forming part of the invention. The usual picking and other loom motions are provided but since they form no part of the invention reference thereto is omitted.

Describing the pertinent major loom elements in more detail, the sword 10 is split as at 16 to clamp the two longitudinal lay members 18 and 19 by means of cap screw 17. The lay members mount the reed 12 by means of shank portions 20 which are retained in the lay assembly by studs 21. Formed on lay member 19 by milling or shaping is an aligning tongue 22 which cooperates with notches 23 formed in the guide plates 13. The guide plates 13 have a shuttle or weft needle receiving and confining recess 24 formed therein. The guide plates are preferably made from stampings so that if the relationship of the stamping die to the aligning tongue 22 is initially made with accuracy, all the notches 23 in the plates will accurately fit the tongue 22 and the plates will be precisely positioned in a vertical direction along the lay.

I prefer to form the clamp means as a series of elongated members 14 of generally U-shaped section. Each clamp member has a base 25 and opposed legs 26 slotted as at 27 to receive the guide plates. Suitable apertures 28 are formed in the base of the clamps to receive the mounting bolts 29 as seen in Fig. 2. To add strength and rigidity to the assembly, I prefer to connect the ends of the plates by means of links 30 and machine screws 31 mounted in holes 28a formed at the ends of the clamp means.

When the plates are assembled, the plates straddle tongue 22 so that the plates are accurately positioned on the lay in a vertical direction. The underside of base 25 of the clamp means engages a portion 32 of each plate to urge it against vertical surfaces of the lay member for fore-and-aft alignment. The slots 27 in each clamp are accurately positioned, preferably being formed by a stamping operation so that the spacing of all the slots is uniform. With this arrangement accurate lateral spacing of the plates along the lay member is provided, the result being that the plates are precisely positioned and firmly held in three planes so that all recesses 24 are accurately aligned for receiving the shuttle. Nevertheless, the guide plates are readily and quickly removed by backing off the various screws or fasteners 29 and 31 whereupon new plates may be fitted, which plates are certain to be aligned because they are all stamped from the same die.

Although the stamping process is well adapted to produce a series of identical guides, it will be understood that in its broader aspects the invention is not limited to stamped guides. Any metal working or forming process that produces accurate and uniform results may be employed, such as forging, casting, die casting and combinations of these processes with machining. However, the guide mounting means is particularly adaptable for use with stamped guide plates, and since stamping is a rapid and economical manufacturing process I prefer specifically to use that process to form the guides.

It will be understood that the mode of operation of the invention is independent of the exact configuration of the parts and that various other aligning and locking devices could be used without departing from the essence of the invention, which is the provision of precise alignment in all planes coupled with a detachable mounting of the guide plates upon the lay assembly. Accordingly, I contemplate that the appended claims and not the preferred embodiment be determinative of the scope of my invention.

What is claimed is:

1. In a loom for weaving, a lay assembly, a plurality of spaced shuttle guides, means for detachably mounting said guides on said lay assembly, said mounting means comprising longitudinally extending clamp means, said clamp means comprising an elongated, generally U-shaped member, the legs of said member being formed with longitudinally-spaced slots perpendicular to the member for locating said guide plates in spaced relation along said lay assembly, and holes in the base of said member between said slots for the reception of fasteners, and fasteners in said holes connected to said lay assembly for detachably mounting said member and guides.

2. In a loom for weaving, a lay assembly, a plurality of spaced shuttle guides, longitudinal tongue and groove means formed on said guides and lay assembly for restraining said guides against vertical motion, means for detachably mounting said guides on said lay assembly, said mounting means comprising longitudinally extending clamp means formed with longitudinally spaced slots for locating said guide plates in spaced relation along said lay assembly, fastening means for urging said mounting means toward said lay assembly, removal of said fastening means freeing said mounting means and guides.

3. In a loom for weaving, a lay assembly, a plurality of spaced shuttle guides, longitudinal tongue and groove means formed on said guides and lay assembly for restraining said guides against vertical motion, means for detachably mounting said guides on said lay assembly, said mounting means comprising longitudinally extending clamp means, said clamp means comprising an elongated, generally U-shaped member, the legs of said member being formed with longitudinally spaced slots for locating said guide plates in spaced relation along said lay assembly.

4. In a loom for weaving, a lay assembly, a plurality of spaced shuttle guides, a longitudinal tongue formed on said assembly, said guides being notched to receive said tongue, means for detachably mounting said guides on said lay assembly, said mounting means comprising longitudinally extending clamp means, formed with longitudinally spaced slots for locating said guide plates in spaced relation along said lay assembly, and means detachably clamping said mounting means and guides on said lay assembly.

5. In a loom for weaving, a lay assembly, a plurality of spaced shuttle guides, interlocking means formed on said guides and lay assembly for restraining said guides against vertical motion, means for detachably mounting said guides on said lay assembly, said mounting means comprising a plurality of longitudinally extending clamp means, each of said clamp means comprising an elongated, generally U-shaped member, the legs of said member being formed with longitudinally-spaced slots for locating said guides in spaced relation along said lay assembly, and apertures in the base of each member for receiving fastening means connected to said lay assembly.

6. In a loom for weaving, a lay assembly, a plurality of stamped shuttle guide plates, means formed on said guide plates and lay assembly for restraining said guide plates against vertical motion, means for detachably mounting said guide plates on said lay assembly, said mounting means comprising a plurality of longitudinally extending clamp means, each of said clamp means comprising an elongated, generally U-shaped member, the legs of said member being formed with longitudinally-spaced slots for locating said stamped guide plates in spaced relation along said lay assembly, and apertures in the base of each member for receiving fastening means connected to said lay assembly, fastening means extending through said apertures and connected to said lay assembly, said clamp means being constructed so that said legs clear the lay assembly when mounted thereon.

7. In a loom for weaving, a lay assembly, a plurality of spaced shuttle guides, complementary tongue and groove means formed on said lay assembly and on shuttle guides, means for detachably mounting said guides on said lay assembly with said tongue and groove means interengaged for locating said guide means transversely of said lay assembly, said mounting means comprising longitudinally extending clamp means formed with longitudinally spaced slots for locating said shuttle guides in spaced relation longitudinally along said lay assembly, and means detachably clamping said mounting means and shuttle guides on said lay assembly.

PETER RUSNOV.

REFERENCES CITED

The following references are of record in the file of this patent:

UNITED STATES PATENTS

| Number | Name | Date |
|---|---|---|
| 2,055,986 | Potemkin | Sept. 29, 1936 |
| 2,100,499 | Whitehead | Nov. 30, 1937 |